Feb. 25, 1964     A. S. PEARSON     3,122,386

FASTENER CLIP DEVICE

Filed March 8, 1961

INVENTOR
ARTHUR S. PEARSON,
BY Walter J. Jones
ATTORNEY

United States Patent Office 3,122,386
Patented Feb. 25, 1964

3,122,386
FASTENER CLIP DEVICE
Arthur Stanley Pearson, Sherwood, Nottingham, England, assignor, by mesne assignments, to United-Carr Fastener Corporation, Boston, Mass., a corporation of Delaware
Filed Mar. 8, 1961, Ser. No. 94,401
1 Claim. (Cl. 287—93)

This invention relates to fastener clip devices and more especially to a clip for retaining a rod or the like in pivoting assembly with an apertured support.

According to the present invention a clip device for securing a rod or the like in pivoting assembly with a support comprises a strip of flexible material having a sleeve for insertion into an aperture in a support to serve as a bearing for part of a rod or the like, the strip having a clip portion spaced from the sleeve for engaging another part of the said rod to secure it in assembly with the support.

The sleeve may comprise a hollow stud formed of resilient radially expandible segments snappable through the aperture in the support, the segments being formed with outwardly projecting shoulder means adapted, when the sleeve is snapped through the aperture, to extend outwardly of the edge of the aperture to secure the sleeve in assembly. The clip portion may comprise a hook like portion formed by providing a hole of approximately the same diameter as the rod or the like and a slot extending from the edge of the clip into the hole such that the clip can be assembled by presenting the open end of the slot to the rod and applying pressure to force it through the slot into the said hole.

To enable the invention to be fully understood it will now be described by way of example with reference to the accompanying drawing, in which.

Figure 1:
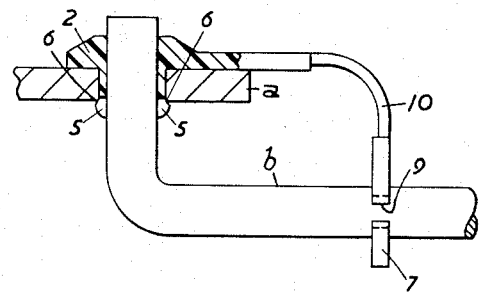
FIGURE 1 is a side view, partly in section, of a rod assembled with an apertured support by the clip device.
Figure 2:
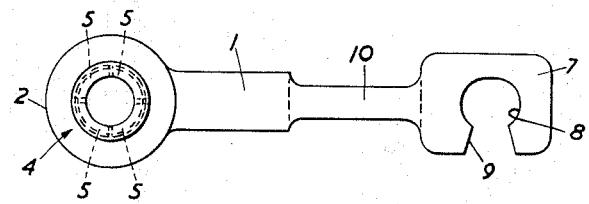
FIGURE 2 is a plan view of the clip device.
Figure 3:
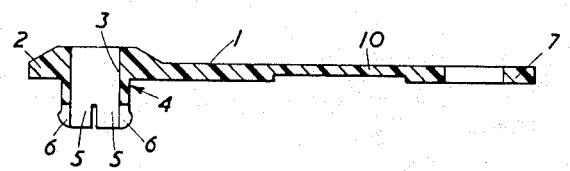
FIGURE 3 is a sectional view thereof.

As shown in the accompanying drawing the clip device comprises a flexible strip 1 of synthetic plastic material for example nylon. At one end the strip has a circular enlargement 2 formed with a central bore 3, the under face of this enlargement having an integral hollow stud portion 4 the walls of which are defined by a series of resilient segments 5 each having a shoulder 6 on its outer face at a location spaced from the adjacent under face of the enlargement 2. As shown the bore 3 of the hollow stud is aligned with the bore 3 in the enlargement 2.

The opposite end of the strip is formed with a clip portion comprising a flat plate like portion 7 having a central aperture 8 and a slot 9 extending from one peripheral edge of the plate and opening to the central aperture 8. Preferably the side walls of the slot 9 diverge such that the slot has a greater width at its outer end remote from the aperture 8.

A portion of the strip adjacent the plate like portion 7 is preferably reduced in width and/or thickness as indicated at 10 to ensure that at this point the strip has a substantial degree of flexibility.

The device is primarily adapted to retaining a rod, pipe or the ilke in pivoting assembly with an apertured support and in particular where the rod includes a portion extending in parallel relation to a supporting plate and is pivotally connected thereto by a cranked end of the rod or the like being inserted into an aperture in the support.

The maximum diameter of the stud portion is normally slightly greater than that of an aperture in a support a (FIGURE 1) with which it is to be assembled and the stud is presented to the aperture and pressure applied to force it therethrough. During this movement the segments 5 will flex inwardly to allow the shoulders 6 to pass through the aperture and when the stud is fully inserted the segments will revert to their original position such that the shoulders 6 will extend outwardly of the edges of the support aperture and abut the under face of the support to secure the stud in assembly. The under face of the enlargement 2 will be in abutting relation with the adjacent face of the support, the strip extending over the support so that its end projects beyond the edge of the support.

A cranked end of a rod b is inserted through the hollow stud which forms a bearing sleeve therefor. The projecting end of the strip is then bent about the portion 10 of reduced width and thickness and the open end of the slot to be presented to the portion of the rod or the like which extends substantially parallel to the opposite face of the support. The rod is then moved laterally through the slot 9 and into the central aperture 8 of the clip portion.

The length of the strip is preferably such that when the clip portion is engaged with the rod it will not permit sufficient movement of the cranked end in a direction at right angles to the support to allow the cranked end to be completely withdrawn from the aperture. The strip will however, allow complete freedom for the rod b to pivot with the attached fastener clip about an axis defined by the aperture in the support.

One particular application of the invention is for securing an operating rod for remotely controlling the door latch of a vehicle, to part of the mechanism.

I claim:

A clip device for securing a rod or the like in pivoted assembly with a support, said clip device comprising a flat strip of flexible synthetic plastic material having a hollow resilient stud portion having a series of resilient segments, and said stud portion extending from one face of said strip normal to the plane of said strip for snap engagement with a support and serving as a bearing for part of a rod or the like and a clip portion formed as a part of said strip and spaced from said resilient stud portion, said clip portion including an aperture formed through said strip, said aperture having its axis in spaced parallel relationship with the axis of said stud portion and said clip portion also having a slot formed therein extending from the edge of the strip into said aperture for receiving another portion of the rod, to secure the rod in assembly with the stud portion.

References Cited in the file of this patent

UNITED STATES PATENTS

| 1,142,979 | Pelton | June 15, 1915 |
|---|---|---|
| 2,578,639 | Bedford | Dec. 11, 1951 |
| 2,881,653 | Sabula | Apr. 14, 1959 |
| 3,007,725 | Becker et al. | Nov. 7, 1961 |

FOREIGN PATENTS

| 230,975 | Great Britain | Mar. 26, 1925 |